United States Patent
Jones (10) Patent No.: US 6,693,646 B1
(45) Date of Patent: Feb. 17, 2004

(54) METHOD AND SYSTEM FOR ITERATIVE MORPHING

(75) Inventor: Michael T. Jones, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/300,916

(22) Filed: Apr. 28, 1999

(51) Int. Cl.$^7$ ................................................ G06T 15/00
(52) U.S. Cl. ...................... 345/646; 345/619; 345/581; 345/419
(58) Field of Search ................................ 345/646, 619, 345/955, 581, 418, 440, 419

(56) References Cited

U.S. PATENT DOCUMENTS

| | | | | |
|---|---|---|---|---|
| 4,291,380 A | | 9/1981 | Rohner | 345/428 |
| 4,646,251 A | * | 2/1987 | Hayes et al. | 364/518 |
| 4,715,005 A | * | 12/1987 | Heartz | 364/521 |
| 4,727,365 A | | 2/1988 | Bunker et al. | 345/425 |
| 4,821,212 A | | 4/1989 | Heartz | 345/426 |
| 4,888,713 A | | 12/1989 | Falk | 345/425 |
| 4,912,659 A | * | 3/1990 | Liang | 364/521 |
| 4,912,664 A | * | 3/1990 | Weiss et al. | 364/577 |
| 4,933,889 A | | 6/1990 | Meshkat et al. | 364/578 |
| 5,367,615 A | * | 11/1994 | Economy et al. | 395/129 |
| 5,448,686 A | * | 9/1995 | Borrel et al. | 395/129 |
| 5,745,666 A | | 4/1998 | Gilley et al. | 395/128 |
| 5,760,783 A | | 6/1998 | Migdal et al. | 345/430 |
| 5,986,666 A | * | 11/1999 | Couvet et al. | 345/430 |
| 6,009,435 A | * | 12/1999 | Taubin et al. | 707/101 |
| 6,037,945 A | * | 3/2000 | Loveland | 345/420 |
| 6,046,744 A | * | 4/2000 | Hoppe | 345/419 |
| 6,094,199 A | * | 7/2000 | Turkiyyah et al. | 345/419 |
| 6,108,006 A | * | 8/2000 | Hoppe | 345/423 |
| 6,362,833 B2 | * | 3/2002 | Trika | 345/646 |

OTHER PUBLICATIONS

Beier, T. and Neely, S., "Feature–Based Image Metamorphosis," *Computer Graphics Proceedings*, vol. 26, No. 2, Jul. 1992, pp. 35–42.

Ferguson, R.L. et al., "Continuous Terrain Level Of Detail For Visual Simulation," Presented at the *Image V Conference*, Phoenix, Arizona, Jun. 19–22, 1990, pp. 1–8.

Fournier, A. et al., "Computer Rendering of Stochastic Models," *Communications of the ACM*, vol. 25, No. 6, Jun. 1982, pp. 371–384.

Fournier, A. et al., "Comment on Computer Rendering of Fractal Stochastic Models", *Communications of the ACM*, vol. 25, No. 8, Aug. 1982, pp. 581–584.

Jones, M., "Lessons Learned from Visual Simulation," *Designing Real–Time 3D Graphics for Entertainment SIGGRAPH '95 Course #6*, May 1995, pp. 2–1–2–34.

Willis, L.R. et al., "A Method For Continuous Adaptive Terrain," Presented at the *1996 Image Conference*, Scottsdale, Arizona, Jun. 23–28, 1996, pp. 1–5.

* cited by examiner

*Primary Examiner*—Matthew Luu
*Assistant Examiner*—Daniel Chung
(74) *Attorney, Agent, or Firm*—Woodcock Washburn LLP (57) ABSTRACT

The present invention provides a system and method for generating new images corresponding to iteratively morphed appearances of a plurality of objects. Data corresponding to appearances of the objects are stored. Embedded objects are morphed with respect to the terrain, whereas other objects are morphed in a predetermined order with respect to previously morphed objects as well as with respect to the terrain. Additionally, iterative morphing using a Bezier Curve technique is described.

10 Claims, 7 Drawing Sheets

METHOD AND SYSTEM FOR ITERATIVE MORPHING

CROSS REFERENCE TO RELATED APPLICATIONS

The following applications having a common assignee are related to the present application, and are herein incorporated by reference in their entireties:

"Morphing Based on Multiple Weighted Parameters," application Ser. No. 09/175,320, Filed Oct. 20, 1998, (pending); and "System and Method for Morphing Based on Multiple Weighted Parameters," application Ser. No. 09/220, 078, Filed Dec. 23, 1998, (pending).

BACKGROUND OF THE INVENTION

1. Field of the Invention

This invention generally relates to graphics systems, and more particularly to morphing data.

2. Related Art

Graphics systems are often used to generate and display images representing objects. A graphics system may store data representative of an object and display an image of the object using the stored data. Such data is also called object data or geometry data.

Morphing refers to changing the shape or appearance of an object. This can come about because of a change in the object, or because the viewer has changed position with respect to the object being viewed.

Often, a display is comprised of a plurality of objects. As an example, a view may consist of a horizon, two hills, and a bridge connected to bridge supports on the tops of the hills. At a distance, the hills may be barely visible, and the bridge may not be visible to the viewer at all. As the viewer "moves closer" to the hills, the hills, the bridge supports, and the bridge become more visible. The location of each of the objects can be given with respect to the coordinate system of the display, both in the "distant" view as well as in the "closer" view, after it has been morphed. However, if the bridge supports and the bridge itself are described with respect to the coordinate system of the display, small errors in either the morphing equation or in the coordinates could result in discontinuities in the display. These discontinuities might appear as if, for example, the bridge were floating over the hill tops, rather than attached to them via the supports. The present invention addresses this problem. In the present invention, the horizon and the hills are morphed with respect to the coordinate system of the display. The bridge supports are then morphed with respect to the new positions of the hills, rather than the coordinate system of the display. In this manner, the bridge supports are "tied" to the tops of the hills, and there will be no discontinuity in the display. Similarly, the bridge itself will be morphed with respect to the bridge supports rather than the coordinate system of the display so that it will be "tied" to the bridge supports (which themselves are tied to the hill tops). This will eliminate the problem of the bridge "floating" over the hill tops.

SUMMARY OF THE INVENTION

The present invention provides a method and system for generating images by iteratively morphing objects from a reference appearance to a final appearance. In one embodiment, objects in the image are morphed sequentially, wherein each morphing is based on a previously morphed object. In a second embodiment, points along a Bezier curve are drawn through iterative morphing. In this embodiment, iterative morphing begins with a set of points or a polynomial from which the Bezier curve is derived.

DETAILED DESCRIPTION OF THE PREFERRED EMBODIMENTS

1. Overview and Discussion of the Invention

The present invention provides a system and method for generating new images corresponding to iteratively morphed appearances of a plurality of objects. Data corresponding to appearances of the objects are stored. Embedded objects are morphed with respect to the terrain. Other, non-embedded, objects are morphed in a predetermined order with respect to previously morphed objects as well as with respect to the terrain.

2. Exemplary Environment

Before describing the invention in further detail, it is useful to describe an exemplary environment in which the invention can be implemented. In a broad sense, the invention can be implemented in any system, method, or computer program product, especially one in which it is desirable to generate new appearances interactively. Such systems include, without limitation, personal computer systems (PCS), work-stations, special purpose computer systems, general purpose computer systems, and many others. The invention may be implemented in hardware, software, firmware, or combination of the like.

3. Incremental Morphing

Geometry data for a scene may typically be comprised of a terrain and one or more objects. Some of the objects are referred to herein as embedded objects, and other objects are referred to herein as "first successive set" objects, "second successive set" objects, etc. The relationship between the terrain and the objects will be discussed in detail later. The terrain and the objects typically have one or more appearances which, in a first implementation, might consist of two appearances that can be referred to as the "reference appearance" and the "final appearance." In other implementations, such as that described in co-pending application entitled "System and Method for Morphing Based on Multiple Weighted Parameters," application Ser. No. 09/220,078, filed Dec. 23, 1998, incorporated herein by reference in its entirety, there may be a plurality of appearances where, as an example, for a face, the reference appearance might be a neutral expression, and the other appearances might be a happy expression, a sad expression, etc. For ease of discussion, and not of limitation, the example herein will be directed toward the image wherein the terrain and the objects each have two appearances, the reference appearance and the final appearance. Those skilled in the relevant art(s) will understand that the principles taught herein will apply to the multiple appearance case and still be within the spirit and scope of the invention.

The terrain and each of the objects in an image typically have one or more sets of attributes for each appearance. Examples of attributes are, for example, coordinate data, color data, texture data, surface normal vector data, etc. For ease of illustration and not of limitation, only coordinate data will be discussed. Thus, the terrain typically has a set of coordinate data corresponding to the reference appearance and a set of coordinate data corresponding to the final appearance. Likewise, the embedded objects and the other objects typically have sets of coordinate data for both the reference appearance and the final appearance.

In an image, the attributes of the terrain and the attributes of each of the objects will typically change between the attributes at the reference appearance and the attributes at the final appearance. That is, for example, as the image moves between the reference appearance and the final appearance, the coordinate data for the terrain will transition between the coordinate data for the reference appearance and the coordinate data for the final appearance. This transition is referred to herein as "morphing." For the exemplary implementation where an attribute, A, of the terrain/object changes linearly between the value of the attribute at the reference appearance and the value of the attribute at the final appearance, the attribute at any point during the morphing can be described by the linear "morphing equation"

$$A = A_0 + \alpha \Delta A.$$

In this equation, the following definitions apply $A_0$ +e,dus $\Delta$ the attribute of the terrain/object at the reference appearance;

$A_f$+e,dus $\Delta$ attribute of the terrain/object at the final appearance;

$\Delta A$ +e,dus $\Delta$ the "morphing vector"=$A_f - A_0$;

$\alpha$+e,dus $\Delta$ the "incremental morphing ratio" where, typically, $o \leq \alpha \geq 1$.

The incremental morphing ratio is the amount that the terrain/object has morphed between the reference appearance and the final appearance. If an image has an appearance that is between the reference appearance and the final appearance, the image can be said to be incrementally morphed.

Consider the following illustrative examples. As a first example, in a scene of a landscape, the terrain might be the horizon, and the objects might be hills on the horizon and a bridge between the tops of the hills. As a second example, in a scene of a castle, the terrain might be a large stone wall, and the objects in the scene might be windows in the wall and ladders coming out of the window.

In the first example, as a viewer gets "closer" to the objects on the horizon (i.e., the hills) the characteristics of the hills become more visible. That is, the hills begin to take form and the tops of the hills and the bases of the hills become more distinct. In this example, the two bridge supports attached to the tops of the hills and the bridge base that runs between the two bridge supports also begin to become more distinct. As the viewer moves away from the hills, they would again become less distinct.

In the example of the castle, as the viewer gets "closer" to the wall, the windows become more distinct as do the ladders coming out of the windows. Thus, while the ladders might not be visible at a distance, they are visible and distinct as the viewer gets closer.

In each of these examples, the attributes of the terrain/object can be calculated by using the morphing equation given above. In these calculations, the coordinates of the terrain (e.g., the horizon in the first example and the wall in the second example) are given with respect to a reference position in the coordinate space of the geometry data. The coordinates of the "embedded objects" described above (e.g., the hills on the landscape and the windows on the wall) are also given with respect to a reference position in the coordinate space of the geometry data. This is because the position of each is "tied to" the terrain. However, other objects, such as the bridge supports and the ladders, have coordinates that are defined with respect to objects other than a reference position in the coordinate space of the geometry data. Bridge supports need to be located on the tops of the hills. Therefore, their positions will be defined with respect to the hill tops, and the morphing equation is evaluated accordingly. Ladders come out of the windows, so their positions are defined with respect to the windows and the morphing equation is evaluated accordingly. This will be discussed in more detail later.

In the example described above, as the image changes appearance (e.g., changes from a view at a distance to a view up-close) each of the attributes of the terrain or the objects may change. For the example of coordinate data, if the reference appearance is a view of the terrain at 50 miles, and the final appearance is a view of the terrain at zero miles, an incremental morphing ratio of 0.5 would mean that the terrain is being viewed as if it were at a distance of 25 miles. This can be calculated by solving the morphing equation $$A_{(25)} = A_{(50)} + (0.50) \cdot [A_{(0)} - A_{(50)}]$$

Each attribute will be morphed 50% of the distance along the vector running from its respective reference position to its respective final position.

4. Generating New Appearances by Iteratively Morphing

The present invention provides a method and system for generating images by iteratively morphing objects from a reference appearance to a final appearance. In one embodiment, objects in the image are morphed sequentially, wherein each morphing is based on a previously morphed object. In a second embodiment, a Bezier curve is iteratively drawn to represent the morphed object.

Iterative morphing is used to morph an image wherein many of the objects in the image are not located with respect to the terrain, but rather with respect to other objects in the image. As an example, bridge supports are typically located with respect to a feature on the terrain, whereas, the bridge itself is located with respect to the bridge supports rather than the terrain. When an image changes, perhaps as a result of the movement of the viewer, all objects in the image may also move. For purpose of illustration, and not of limitation, consider again the example of the bridge.

When the viewer moves closer to the object of interest (e.g., two hills and a bridge between the tops of the hills), the terrain changes appearance, as does most (if not all) of the other objects in the image. Typically, the two hills in the image will morph to a larger appearance, and the bridge running between the tops of the hills becomes more visible. Typically, the hills can be considered to be embedded on the terrain, and their morphing can be accomplished with respect to the terrain. The bridge may also be morphed with respect to the terrain, but any small errors in either the morphing equation or in the coordinates may result in a discontinuity on the display.

The present invention addresses this shortcoming. In the present invention, the hills are morphed with respect to the terrain, as described above. However, the bridge supports are then morphed with respect to the previously morphed position of the tops of the hills. The bridge itself is connected to the bridge supports, and therefore, there will be no disconnect between the ends of the bridge and the tops of the hills. This technique will be described in detail, below.

Figure 1:
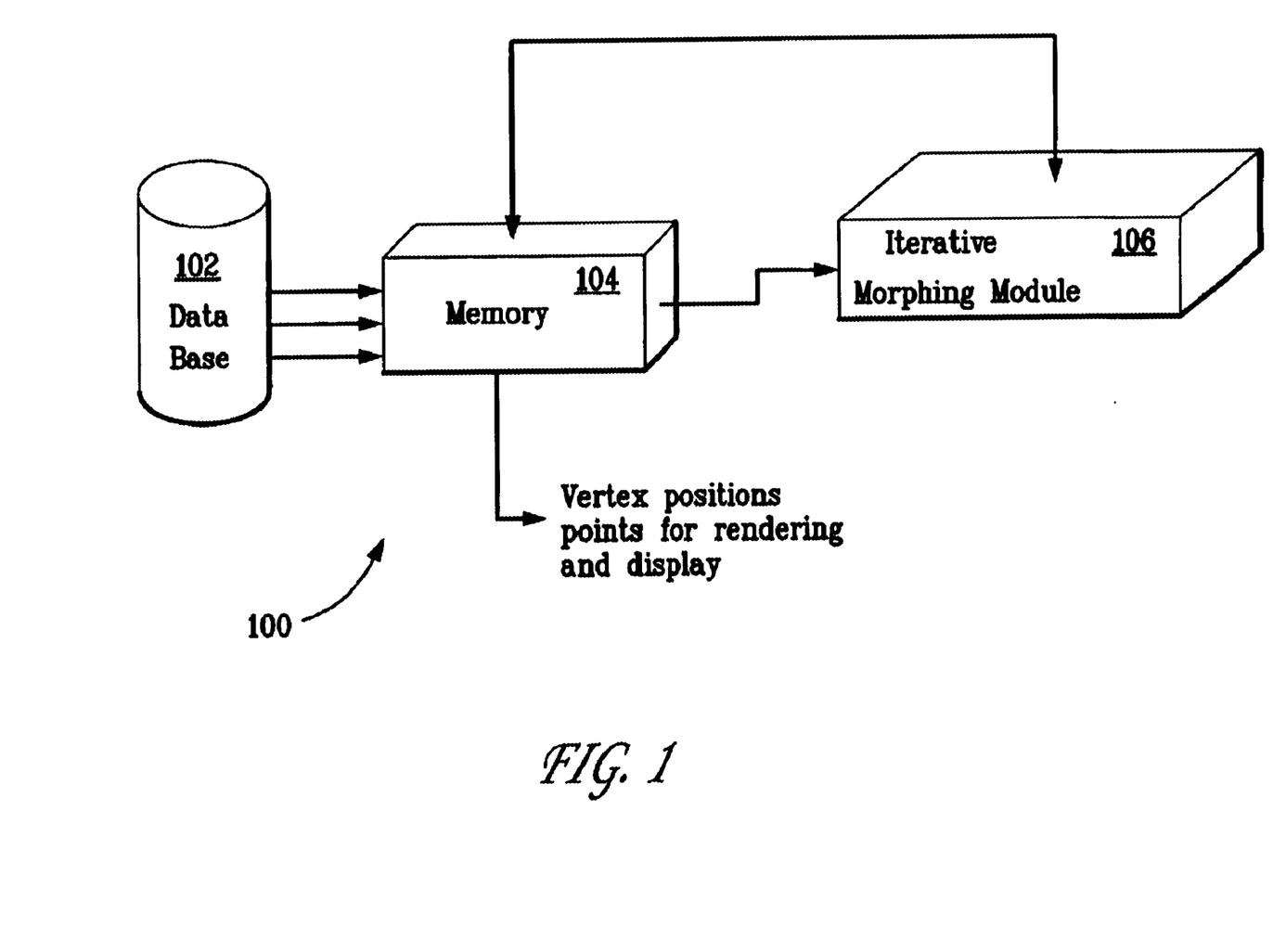
FIG. 1 is drawing representing an exemplary computer architecture supporting the present invention.

In FIG. 1, an exemplary computer architecture 100 is shown. A data base 102 stores reference appearance data and final appearance data for each object in the image. The reference appearance may correspond to the initial view of an image, and the final appearance may correspond to the final view of an image. Typically, one or more attributes may be stored for each object in each appearance. These attributes may include, by way of example and not of limitation, coordinate data, color, texture, and surface normal vector.

The attribute data sets are then transferred from data base 102 to a memory 104. Memory 104 is linked to an iterative morphing module 106 wherein the morphing equation is solved. Those skilled in the relevant art(s) will appreciate, based on the teachings contained herein, that iterative morphing module 106 can be implemented in hardware, software, or any combination thereof. For example, iterative morphing module 106 can be implemented in hardware in the geometry engine of a graphics subsystem. Iterative morphing module 106 can be implemented in software in any application program or developer library. The iterative morphing calculations will be described in further detail below.

After iterative morphing is complete, the geometry engine will output the final geometry data of a scene to be rendered. For example, information relating to primitives (e.g., vertex positions), rendering, and display of the image are output for further processing in the graphics subsystem. As an example, as would be apparent to a person skilled in the relevant art(s), the final geometry data can be scan-for-scan conversion, rasterization, texture mapping, shading, and other graphics processing operations.

Figure 2:
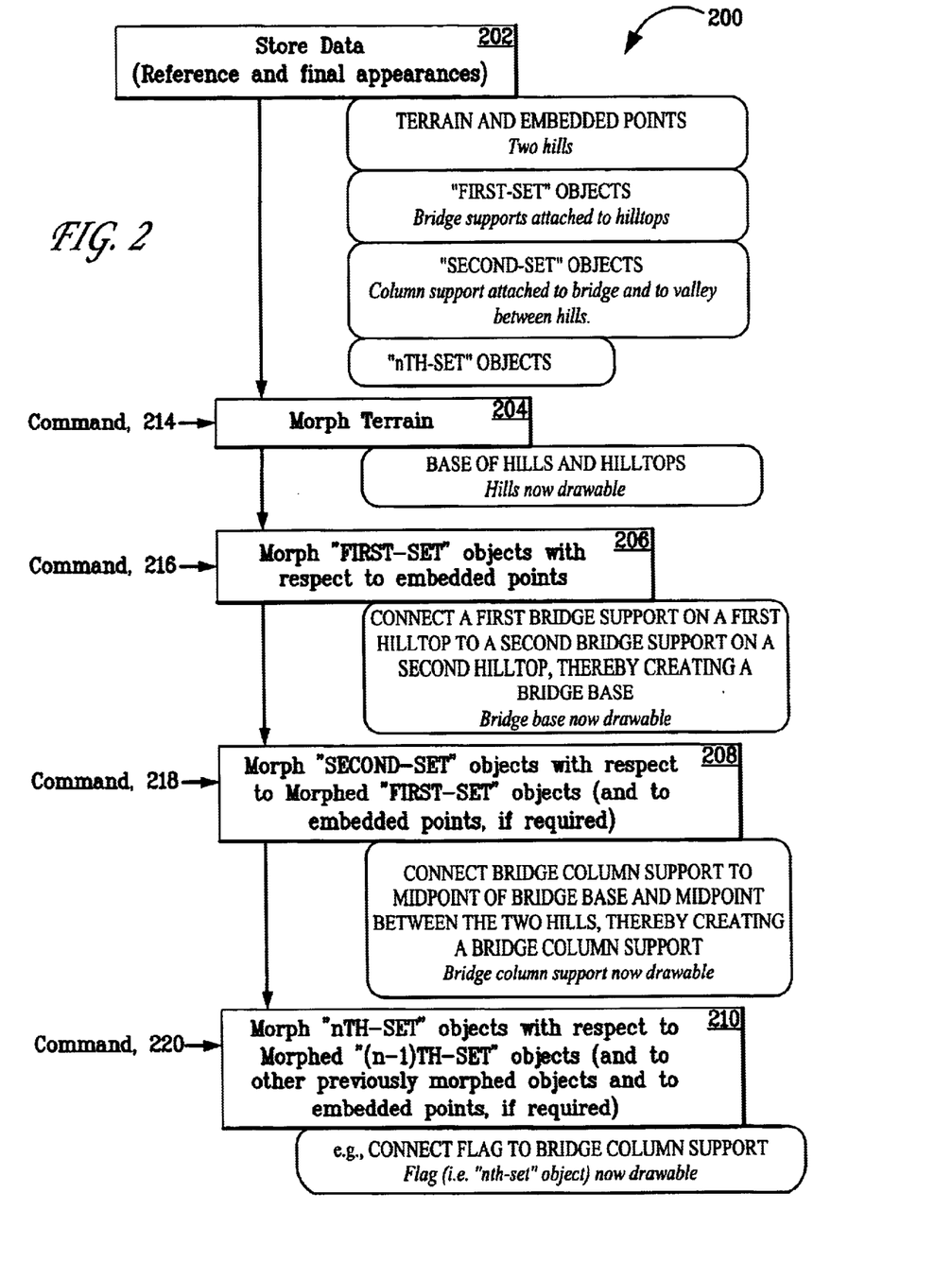
FIG. 2 is a flow chart representing iterative morphing using an example of a bridge to illustrate the method.

FIG. 2 illustrates a flowchart 200 that depicts in greater detail the operation of an embodiment of the invention. It is noted that the ordering of the steps of the flowchart 200 is not mandatory, and that other orderings of the steps may be possible and are within the spirit and scope of the present invention. Such other orderings will be apparent to persons skilled in the relevant art(s) based on the teachings contained herein.

For purposes of illustration, and not of limitation, the method described by flowchart 200 will be directed toward an example of a terrain containing two hills, a bridge connected to the tops of the two hills, a bridge column support connected to the middle of the bridge and to a valley between the hills, and a flag connected to the bridge column support. Also, for ease of discussion, the attributes that will be discussed will be for coordinate data. Those skilled in the relevant art(s) will understand that the same method may be applied to other attributes.

In step 202, reference appearance data and vector data are stored. This data corresponds to the "Initial set objects," such as the terrain and embedded points on the terrain, and to "first successive set" through "$n^{th}$ successive set" objects.

As an example, the terrain may be the horizon and the embedded points may be the bases and the tops of two hills. The "first successive set" objects may be bridge supports that are attached to the tops of the hills and the corresponding bridge base running between the supports. Thus, each bridge support is located with respect to a position defined by an embedded point. The "second successive set" objects may include a bridge column support for the middle of the bridge. In this example, the bridge column support is connected at its top to the middle of the bridge base and at its bottom to a point in the valley between the two hills. Thus, the bridge column support will be located with respect to a position defined by a "first successive set" object (i.e., the bridge base), and a position defined by embedded points (i.e., the point in the valley between the bases of the hills). The "$n^{th}$ successive set" objects may include a flag that is attached to a mid-point on the bridge column support. Thus, it is located with respect to a position defined by a "second successive set" object.

As each attribute is morphed, the morphing equation will be solved and the attribute will "move" along a difference vector from the reference appearance to the final appearance. Thus, as an example, and not meant to be limiting, if the image were to be morphed 40%, typically, each attribute of each object would move 40% of the distance along the difference vector. However, those skilled in the relevant art(s) will understand, based on the teachings contained herein, that each object may be independently morphed an amount other than 40%. A more thorough discussion of morphing along difference vectors is contained in co-pending U.S. Patent Application entitled "System and Method for Morphing Based on Multiple Weighted Parameters," application Ser. No 09/220,078, filed Dec. 23, 1998, the full disclosure of which is incorporated herein by reference.

In step 204, the initial set objects, such as the terrain and the embedded points, are morphed. The morphing equation will be solved in response to a command 214 that is generated to reflect how much the image is to change based on the relative movement of the viewer with respect to the image. As an example, and not meant to be limiting, if the viewer is moving to a position that is half the distance between the reference position and the final position, the morphing might be said to be a 50% morph. Thus, in this example, the embedded points in the image might move half of the distance from their respective reference locations to their respective final locations. In the example of flowchart 200, the embedded points corresponding to the bases and the tops of two hills will morph to a new position, and the morphed hills can be drawn.

In step 206, the "first successive set" objects are morphed and the morphing equations will be solved in response to a command 216. Command 216 is generated to reflect how much the image is to change based on the relative movement of the viewer with respect to the image. In this step, however, the solution of the morphing equations and the location of the morphed "first successive set" objects is with respect to the morphed embedded objects, and not with respect to the un-morphed reference positions of the "first successive set" objects themselves. In this example, the "first successive set" objects are bridge supports that are attached to the tops of the morphed hills. Once the bridge supports have been morphed to a position with reference to the morphed tops of the hills, the bridge supports are then drawable. A bridge base connecting the bridge supports can be drawn between the two bridge supports. Thus, the bridge base is expressed as a drawable set of points as a result of two iterative morphings. The first iteration is the morphing of the hill tops with respect to the horizon, and the second iteration is the morphing of the bridge supports with respect to the morphed hill tops.

In step 208, the "second successive set" objects are morphed and the morphing equations will be solved in response to a command 218. Command 218 is generated to reflect how much the image is to change based on the relative movement of the viewer with respect to the image. In this step, however, the solution of the morphing equations and the location of the morphed "second successive set" objects is with respect to the morphed "first successive set" objects and the morphed embedded objects, and not with respect to the un-morphed reference positions of the "second successive set" objects themselves. In this example, the "second successive set" object is a vertical bridge column support that is attached at its top end to the middle of the bridge base (which is drawn between the morphed bridge supports) and attached at its bottom end to a point in the valley midway between the morphed bases of the two hills. Thus, the bridge column support has been drawn as a result of three iterative morphings at its top end and two iterative morphings at its bottom end. At the top end, the first iteration is the morphing of the hill tops with respect to the horizon, the second iteration is the morphing of the bridge supports with respect to the morphed hill tops, and the third iteration is the morphing of the top end of the bridge column support with respect to the mid-point of the bridge. At the bottom end, the first iteration is the morphing of the bases of the hills with respect to the horizon, and the second iteration is the morphing of the bottom end of the bridge column support with respect to the mid-point between the morphed bases of the two hills.

Step 210 illustrates that the iterative morphing process can proceed through any number of iterations, shown here as the morphing of the "$n^{th}$ successive set" objects. In step 210, the "$n^{th}$ successive set" objects are morphed and the morphing equations will be solved in response to a command 220. Command 220 is generated to reflect how much the image is to change based on the relative movement of the viewer with respect to the image. In this step, however, the solution of the morphing equations and the location of the morphed "$n^{th}$ successive set" objects is with respect to the morphed "$(n-1)^{th}$ successive set" objects, to all previously morphed "$i^{th}$ successive set" objects, and to the morphed embedded objects, and not with respect to the un-morphed reference positions of the "$n^{th}$ successive set" objects themselves. In this example, the "$n^{th}$ successive set" object is a flag to be attached to the bridge column support, and, for illustrative purposes, is described as a "third successive set" object. Thus, the flag has been drawn as a result of four iterative morphings and four solutions of the morphing equations. The first iteration is the morphing of the hill tops with respect to the horizon, the second iteration is the morphing of the bridge supports with respect to the morphed hill tops, the third iteration is the morphing of the top end of the bridge column support with respect to the mid-point of the bridge, and the fourth iteration is the morphing of the flag with respect to the bridge column support.

As stated above, there can be any number of iterations based on the complexity of the image and the fidelity of the representation. Regardless of the number of iterations, however, the iterative morphing module need only evaluate linear morphing equations. Those skilled in the relevant art(s) will understand that the iterative morphing module can solve higher order equations, if so programmed. The example provided above described four iterative morphings. This was provided for illustrative purposes only, and those skilled in the relevant art(s) will understand, based on the teachings contained herein, that additional morphings may be performed in the iterative manner described.

Figure 3A:
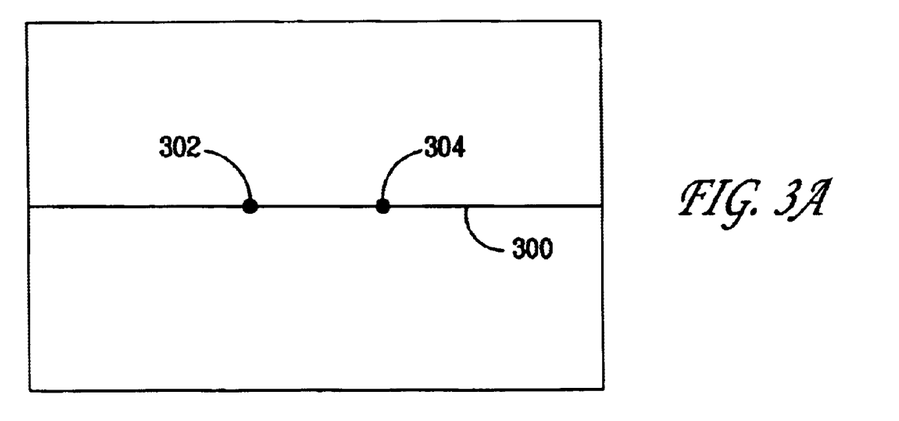
FIGS. 3A–3E display illustrative examples of a series of iteratively morphed images.
Figure 3B:
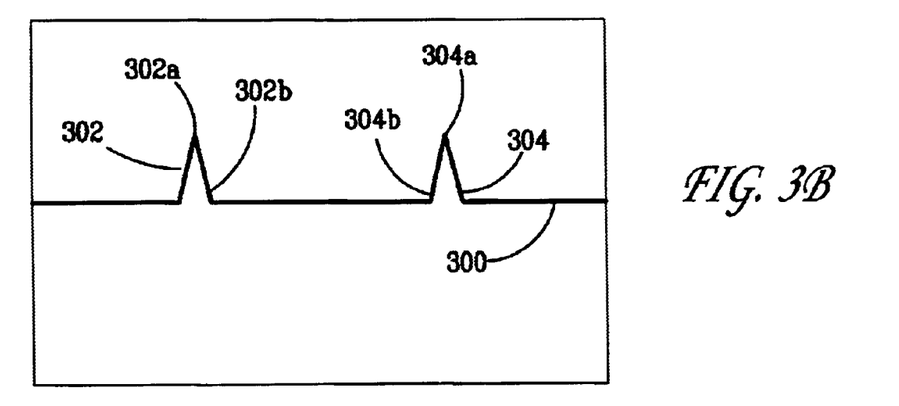

FIGS. 3A–3E illustrate examples of iterative morphing according to the method described in FIG. 2. In FIG. 3A, the reference appearance of the image is displayed as stored in step 202 of FIG. 2. The terrain reference position has a horizon 300, a first hill 302, and a second hill 304. In step 204, the terrain is morphed. This is the first iteration, and is shown in FIG. 3B, where hill 302 is now shown to have a top 302a and a base 302b, and hill 304 is now shown to have a top 304a and a base 304b.

Figure 3C:
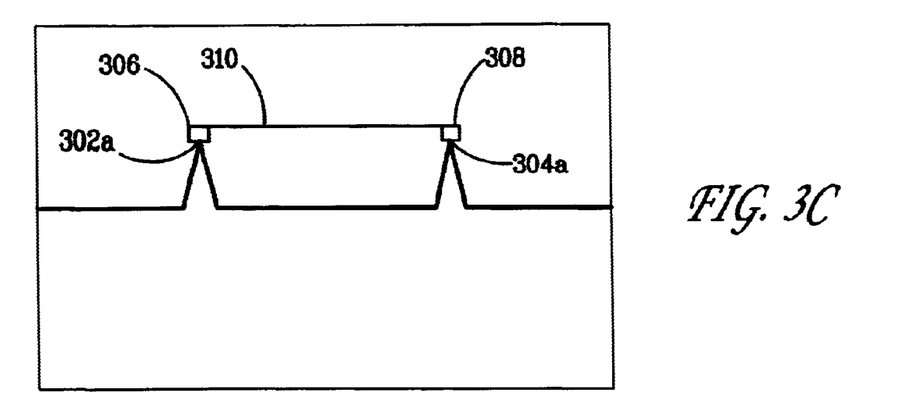

In step 206, the "first successive set" objects are morphed. This is seen in FIG. 3C, wherein a bridge support 306 and a bridge support 308 are morphed with respect to hill top 302a and hill top 304a, respectively. A bridge base 310 can now be drawn between bridges supports 306 and 308.

Figure 3D:
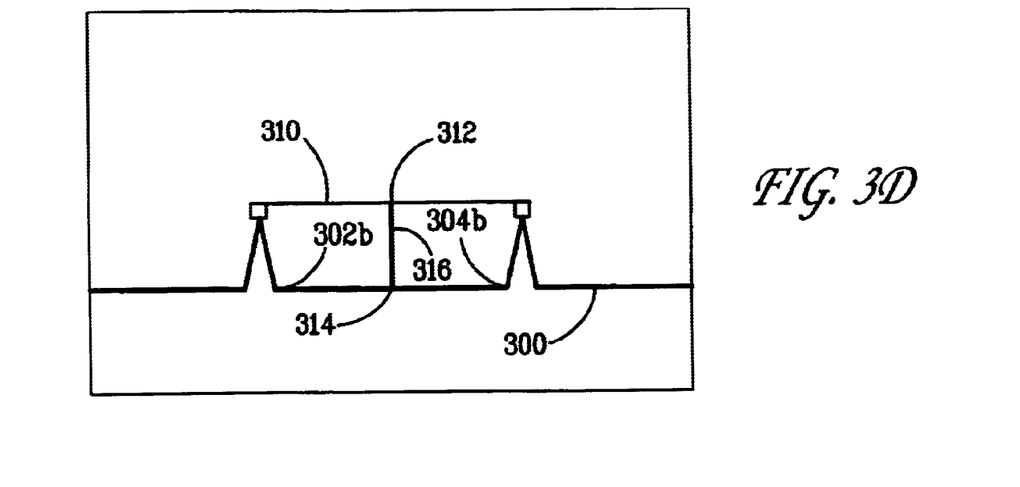

In step 208, the "second successive set" objects are morphed. This is displayed in FIG. 3D, wherein a bridge support column 316 is morphed. Bridge support column 316 has a top end 312 that is morphed with respect to the mid-point of bridge base 310. Bridge support column also has a bottom end 314 that is morphed with respect to the mid-point between hill base 302b and hill base 304b.

Figure 3E:
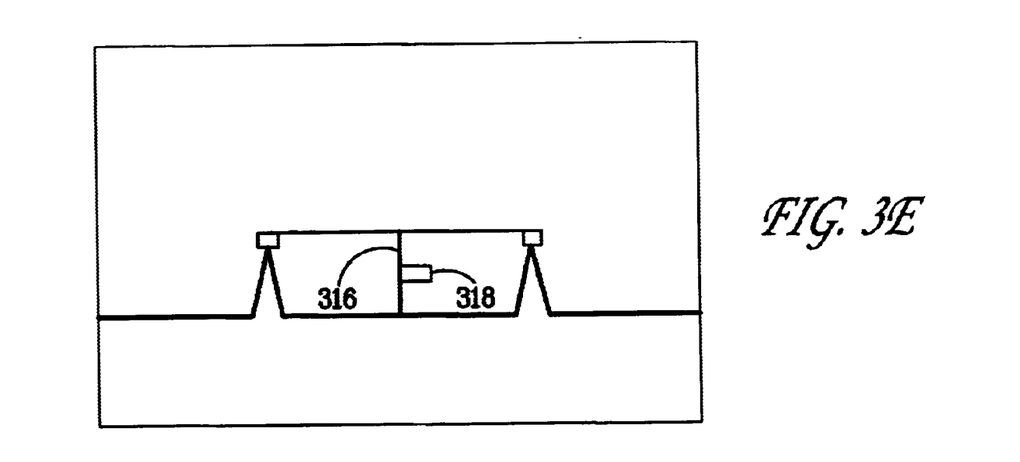

Finally, in step 210, the "$n^{th}$ successive set" object is morphed. In the example herein, FIG. 3E shows a flag 318 connected to the mid-point of bridge support column 316.

5. Generating a Display Using Bezier Curve Techniques

A second embodiment of the instant invention is the use of Bezier Curve techniques to iteratively draw a curve or morph an attribute in the image. This embodiment also takes advantage of the iterative morphing concept.

This embodiment has at least two implementations. In the first implementation, the position of the terrain or objects in the image is best described 25 by a non-linear equation. An example might be a "rope bridge" between two cliffs. Rather than the base of the bridge being a straight line, it may "sag" and thus is best described by a non-linear equation, such as the cubic equation $$Y = A + (B \cdot X) + (C \cdot X^2) + (D \cdot X^3)$$

where X and Y represent the coordinates of the points along the bridge.

A second implementation is wherein the terrain or an object does not morph linearly between the reference appearance and the final appearance. That is, the morphing equation may be represented by a higher order equation such as $$A = A_0 + \alpha \Delta A_1 + \alpha^2 \Delta A_2 + \ldots + \Delta A_n$$

where $\alpha$ is the incremental morphing ratio.

In both exemplary implementations, the use of Bezier Curve techniques will result in the ability to evaluate a series of linear equations, each of which can be solved by the iterative morphing module. A discussion of the use of Bezier Curve techniques will now follow.

General Discussion of Bezier Curve Techniques

Bezier Curve techniques may be used to solve any polynomial of the type $$y = A_n \cdot x^n + A_{n-1} \cdot x^{n-1} + \ldots + A_2 \cdot x^2 + A_1 \cdot x + A_0$$

Thus, when an object can be displayed by a curve that is represented by a quadratic equation, n will equal 2.

Likewise, when the object can be displayed by a curve that is represented by a cubic equation, n will equal 3.

Figure 4A:
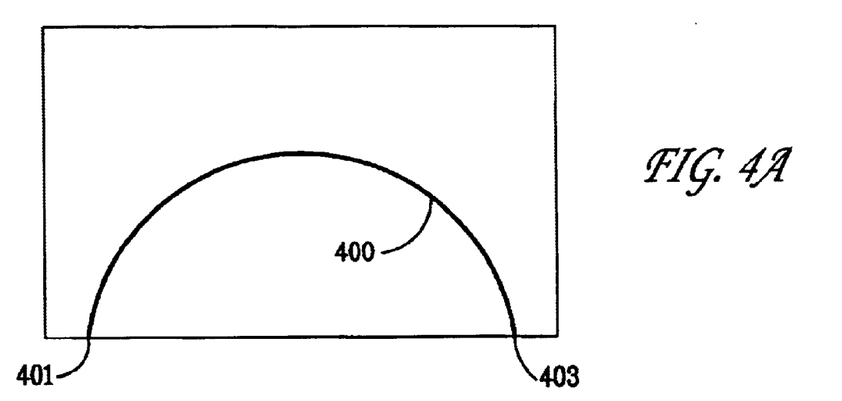
FIGS. 4A–4D illustrate the use of Bezier Curve techniques to iteratively morph to a point.

The iterative process of the Bezier Curve approach can be seen in FIGS. 4A–4D. In FIG. 4A, a curve 400 is displayed. Curve 400 can be represented by the cubic equation $$y = K_3 \cdot x^3 + K_2 \cdot x^2 + K_1 \cdot x + K_0$$

A cubic equation is used for illustrative purposes only, and is not limiting. Curve 400 has a point 401 which is the "starting point" of the curve and corresponds to the reference appearance of an image, and a point 403 which is the "end point" of the curve and corresponds to the final appearance of an image. If it were desired to locate a position that is 50% of the distance along curve 400, the following approach could be used.

Figure 4B:
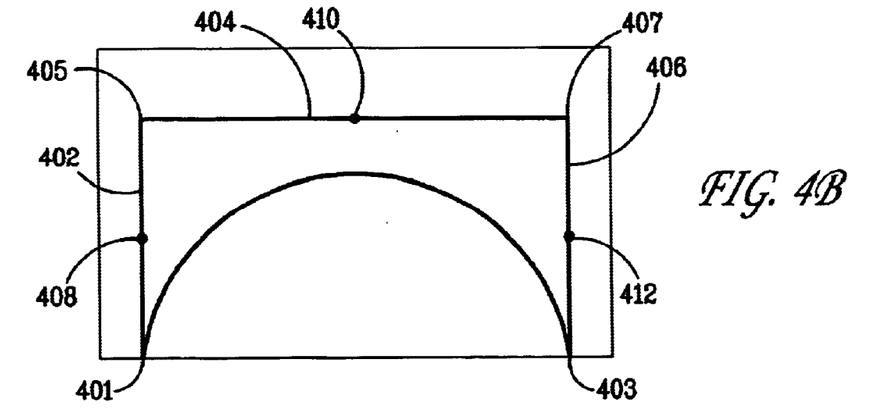

For the first iteration, iteration lines 402, 404, and 406 are drawn in FIG. 4B. Line 402 is the line that runs from point 401 to a point 405 and has a mid-point 408, line 404 runs from point 405 to a point 407 and has a mid-point 410, and line 406 runs from point 407 to point 403 and has a mid-point 412. The locations of points 401, 405, 407, and 403 can be calculated from the coefficients of the cubic equation representing the curve. That is,

| point 401 | is equal to | $K_0$; |
| point 405 | is equal to | $\frac{1}{3} \cdot K_1 + K_0$; |
| point 407 | is equal to | $\frac{1}{3} \cdot K_2 + \frac{2}{3} \cdot K_1 + K_0$; and |
| point 403 | is equal to | $K_3 + K_2 + K_1 + K_0$. |

Recall, also, that point 401 corresponds to the value of y when x equals zero, and is analogous to the "starting point" of the curve, and point 403 corresponds to the value of y when x equals one (i.e., the maximum value), and is analogous to the end point of the curve.

Figure 4C:
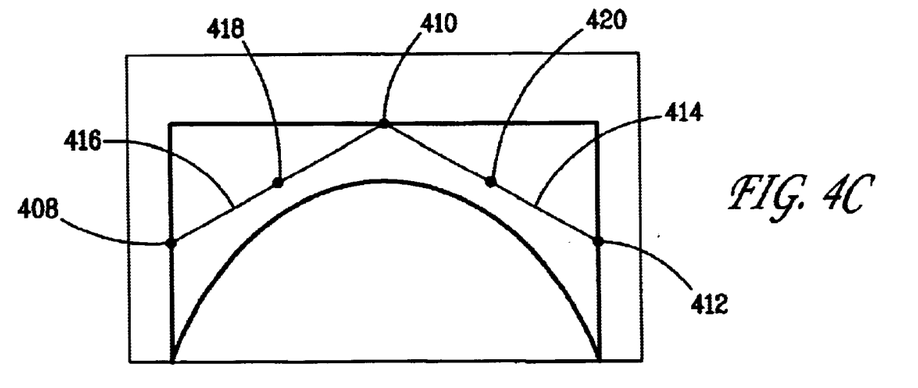

For the second iteration, iteration lines 416 and 414 are drawn in FIG. 4C. Line 416 is the line that runs from point 408 to point 410 and has a mid-point 418 and line 414 runs from point 410 to point 412 and has a mid-point 420.

Figure 4D:
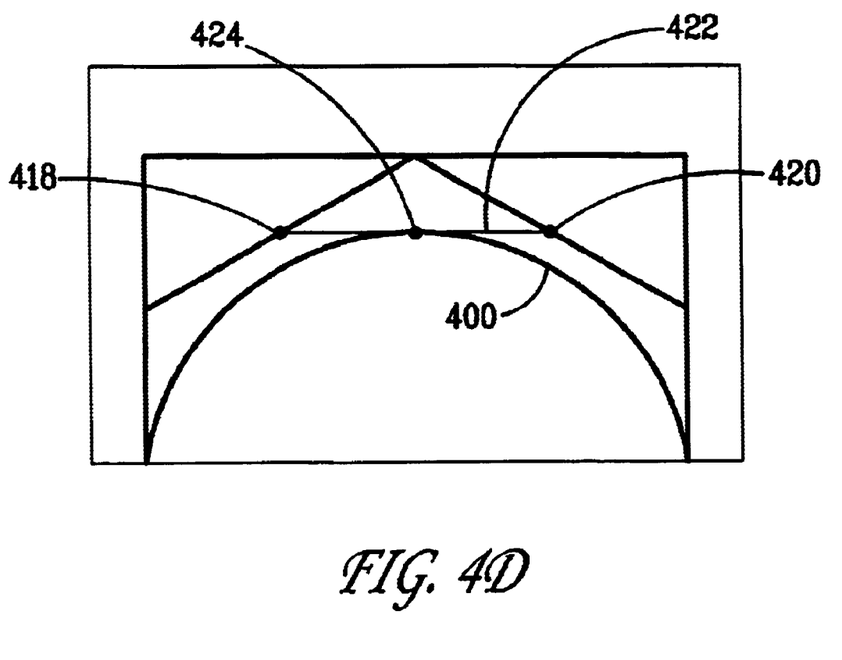

For the third iteration, iteration line 422 is drawn in FIG. 4D. Line 422 is the line that runs from point 418 to point 420 and has a mid-point 424.

Point 424 corresponds to the 50% point on curve 400. Thus, by using the Bezier Curve technique, the 50% point was determined by using an iterative series of linear calculations. In other words, a cubic equation was accurately and precisely evaluated by evaluating six linear equations.

It can be shown that any higher order polynomial can be solved using the iterative series of linear calculations of the Bezier technique as described above. Thus, if a computer is programmed to evaluate a series of linear equations, it can evaluate any higher order polynomial, regardless of order, without having to be specifically programmed for it. That is, it can solve a third order equation by solving six linear equations, it can solve a fourth order equation by solving ten linear equations, it can solve a fifth order equation by solving fifteen linear equations, etc. In other words, the computer can perform an iterative series of linear calculations, regardless of the order of the polynomial, rather than having to be contingently programmed for a plurality of polynomials.

Bezier Curve Techniques for the Present Invention

For a first implementation, wherein a curve must be drawn to represent, for example, a sagging bridge, the iterative morphing module may be used to solve the equation representing the sagging bridge by using the Bezier Curve techniques described above. Consider that the bridge can be represented by the equation $$Y_i = aX_i^3 + bX_i^2 + cX_i + d$$

where $Y_i$ is the value of the dependent variable Y for the corresponding value $X_i$ of the independent variable X. The independent variable, X, has a value that starts at $X_0$ and runs to $X_f$. An operator can select a number of increments, "n," into which X will be divided, and thus determine the corresponding incremental value of X, "$\delta_x$+e,dus $\Delta 1/n$" such that: $X_i = X_0 + (i \cdot \delta_x) \cdot (X_f - X_0)$.

In other words $$X_1 = X_0 + \delta_x \cdot (X_f - X_0)$$

$$X_2 = X_0 + (2 \cdot \delta_x) \cdot (X_f - X_0) = X_1 + \delta_x \cdot (X_f - X_0)$$

$$X_3 = X_0 + (3 \cdot \delta_x) \cdot (X_f - X_0) = X_2 + \delta_x \cdot (X_f - X_0)$$

$$\ldots$$

$$X_n = X_0 + (n \cdot \delta_x) \cdot (X_f - X_0) = X_{(n-1)} + \delta_x \cdot (X_f - X_0) = X_f$$

As an example, if the number of increments were 10, X would be incremented by an amount equal to $(X_f - X_0)/10$ or $(0.1) \cdot (X_f - X_0)$.

To draw ten single points on the line (in accordance with the desires of the operator), the cubic equation will have to be solved ten times, once for each of the points [i.e., for $(i \cdot \delta_x) = 0.1, 0.2, \ldots 1.0$]. The incremental morphing module can be used to solve six linear equations for each incremental value of X (i.e., for each of the ten points), rather than requiring the graphic program to be designed to handle the cubic equation. Since the Bezier Curve technique can be used for any higher order equation, by using the iterative morphing module, the equation can be solved, and the curve can be drawn, even if the degree of the equation (e.g., quadratic, cubic, quartic, etc.) is not known when the graphics program is designed.

The second implementation of the Bezier Curve technique is for the situation wherein the terrain and/or an object does not morph linearly between the reference point and the final point. Mathematically, the morphing equation can be represented by the equation $$A = A_0 + \alpha \Delta A_1 + \alpha^2 \Delta A_2 + \ldots + \alpha^n \Delta A_n$$

where $\alpha$ is the incremental morphing ratio and $A_0$ is the reference position. Thus, for an example wherein the non-linear morphing follows the cubic equation $$A = A_0 + \alpha \Delta A_1 + \alpha^2 \Delta A_2 + \alpha^3 \Delta A_3$$

the iterative morphing module can iteratively solve six linear equations in the manner described above to determine the desired attributes of the terrain/object at any value of $\alpha$.

Figure 5:
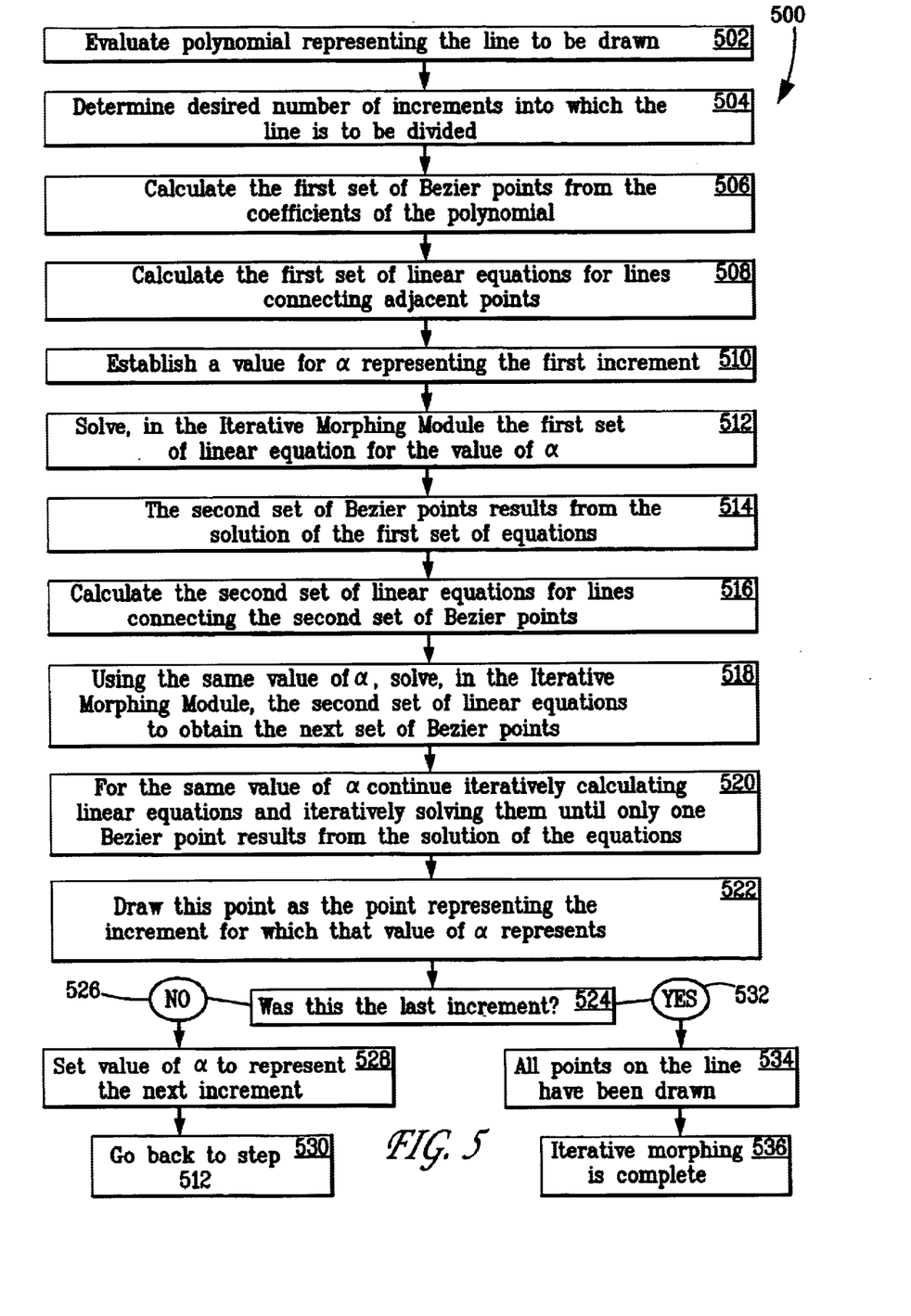
FIG. 5 is a flow chart of a routine according to another embodiment of the present invention.

FIG. 5 illustrates a flowchart 500 depicting the operation of an embodiment of the invention. In step 502, the polynomial that represents the line to be drawn is evaluated. In step 504, the number of intervals into which the line is to be divided is determined, and in step 506 the first set of Bezier points are calculated.

The first set of linear equations are calculated in step 508. These linear equations represent the lines connecting the adjacent Bezier points. As an example, and not meant to be limiting, if the polynomial is a third order polynomial (i.e., a cubic equation), there will be four points in the first set of Bezier points. There will be three lines connecting these four points, and each line will be of the form $Y = \alpha X + b$.

After it has been determined the number of increments desired to adequately represent the polynomial line, a value of a is established in step 510 for the first increment. Using this value of α, the linear equations are solved in the Iterative Morphing Module as shown by step 512. The result of these iterative calculations is the second set of Bezier points, as seen in result 514. In the example of the cubic equation given above, three linear equations are solved in the Iterative Morphing Module resulting in three points in the second set of Bezier points. In step 516, the second set of linear equations are calculated. These equations represent the lines connecting the second set of Bezier points. In the example where there are three points in the second set of Bezier points, there will be two lines connecting them. In step 518, the second set of linear equations are solved in the Iterative Morphing Module. This is done using the same value of α as was used before. This process is continued, as can be see in step 520, until there is only one Bezier point remaining. This point is the point representing the first increment of the line, and is drawn in step 522.

In step 524, it is determined whether or not this was the last increment of the line. If not (see step 526), in step 528 the value of a is reset to represent the next increment of the line. Step 530 send the process back to step 512 to be repeated for the new value of a. However, if this was the last increment (see step 532) all points will have been drawn (see step 534) and in step 536, the iterative morphing is complete.

It is noted that the ordering of the steps of the flowchart 500 is not mandatory, and that other orderings of the steps may be possible and are within the spirit and scope of the present invention. Such other orderings will be apparent to persons skilled in the relevant art(s) based on the teachings contained herein.

6. Conclusion

Thus, the present invention is described in the context of several examples. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for iteratively morphing sets of object data, the sets of object data including an initial set of object data points and first through n successive sets of object data points, each of the successive sets of object data having a corresponding reference position and a corresponding morphing vector, the method comprising the steps of:

(1) defining the initial set of object data points and the first through n successive sets of object data points and a relationship between the successive sets of object data points, wherein each set of object data points represents a distinct object in a scene to be rendered;

(2) morphing the initial set of object points along the corresponding morphing vector in accordance with a command of an operator, to obtain a first morphed set of object points; and (3) morphing each of a first through n successive sets of object data points along the corresponding morphing vector in accordance with a command of an operator based on a respective prior morphed set of object points to obtain an iteratively morphed first through n successive sets of object data points, whereby said iteratively morphed first though n successive sets of object data points and said first through n morphed sets of object points are both drawable points that can be rendered in a scene.

2. The method of claim 1, further comprising the steps of:

(a) storing data associated with the corresponding reference position of the initial set of object data points;

(b) storing data associated with the corresponding morphing vector of the initial set of object data points;

(c) storing data associated with the corresponding reference position of each of the one or more successive sets of object data points;

(d) storing data associated with the corresponding morphing vector of each of the one or more successive sets of object data points; and wherein, steps (a) through (d) may occur in any order with respect to each other, and steps (a) and (b) occur before step (1), and steps (c) and (d) occur before step (2).

3. The method of claim 1, wherein said morphing of each of the one or more successive sets of object data points is based on one or more iteratively morphed prior successive sets of object data points and said first morphed set of object points.

4. The method of claim 1, wherein one or more of the morphing vectors are zero vectors.

5. A system for iteratively morphing sets of object data, the sets of object data including an initial set of object data points and first through n successive sets of object data points, each of the successive sets of object data having a corresponding reference position and a corresponding morphing vector, comprising:

a defining means for defining the initial set of object data points and the first through n successive sets of object data points and a relationship between the successive sets of object data points, wherein each set of object data points represents a distinct object in a scene to be rendered;

a first morphing means for morphing the initial set of object points along the corresponding morphing vector in accordance with a command of an operator, to obtain a first morphed set of object points; and a second morphing means for morphing each of a first through n successive sets of object data points along the corresponding morphing vector in accordance with a command of an operator based on a respective prior morphed set of object points to obtain an iteratively morphed first through n successive sets of object data points, whereby said iteratively morphed first though n successive set of object data points and said first through n morphed set of object points are both drawable points that can be rendered in a scene.

6. The system of claim 5, further comprising:

a first storing means for storing data associated with the corresponding reference position of the initial set of object data points;

a second storing means for storing data associated with the corresponding morphing vector of the initial set of object data points;

a third storing means for storing data associated with the corresponding reference position of each of the one or more successive sets of object data points; and a fourth storing means for storing data associated with the corresponding morphing vector of each of the one or more successive sets of object data points.

7. The system of claim 5, wherein said second morphing means for morphing of each of said first through n successive set of object data points is based on one or more iteratively morphed prior successive sets of object data points and said first morphed set of object points.

8. The system of claim 6, wherein one or more of the morphing vectors are zero vectors.

9. A computer program for use with a computer system comprising a host processor, a main memory, an iterative morphing module, a graphics controller, and a display unit for iteratively morphing sets of object data, the sets of object data including an initial set of object data points and first through n successive sets of object data points, each of the sets of object data having a corresponding reference position and a corresponding morphing vector, the computer program product comprising:

a first computer readable program code means that enables the defining of the initial set of object data points and the first through n successive sets of object data points and a relationship between the successive sets of object data points, wherein each set of object data points represents a distinct object in a scene to be rendered;

a second computer readable program code means that enables the iterative morphing module to morph the initial set of object points along the corresponding morphing vector in accordance with a command of an operator, to obtain a first morphed set of object points; and a third computer readable program code means that enables the iterative morphing module to morph each of a first through n successive sets of object data points along the corresponding morphing vector in accordance with a command of an operator based on a respective prior morphed set of object points to obtain an iteratively morphed first through n successive sets of object data points, whereby said iteratively morphed first though n successive set of object data points and said first through n morphed set of object data points are both drawable points that can be rendered in a scene.

10. A method for drawing one or more points to represent a non-linear curve on a graphics display, the non-linear curve being represented by an equation of the $n^{th}$ order, the non-linear curve beginning at a starting point and ending at a finish point, the non-linear curve being divided into "m" increments, each of the "m" increments being an "$i^{th}$" increment, and further being described as a percentage, "$\rho_i$", of the total length of the non-linear curve between the starting point and the finish point, wherein "i" is an integer between one and "m," inclusive, each of the one or more points being an "$i^{th}$" point, the method comprising the steps of:

(1) calculating a location for each Bezier point in a first set of Bezier points, the quantity of said Bezier points being one more than the order of the non-linear curve;

(2) calculating a first set of linear equations for lines connecting each adjacent Bezier point of said first set of Bezier points, the quantity of linear equations in said first set of linear equations being one less than the quantity of Bezier points in said first set of Bezier points;

(3) selecting the "$i^{th}$" increment to be a first increment;

(4) evaluating iteratively, in an iterative morphing module, each of said linear equations in said first set of linear equations for the value "$\rho_i$," said evaluating resulting in a location for each next point in a next set of Bezier points;

(5) calculating a next set of one or more linear equations for one or more lines connecting each adjacent next point in said next set of Bezier points;

(6) evaluating iteratively, in an iterative morphing module, each of said one or more linear equations in said next set of linear equations for the value "$\rho_i$," said evaluating resulting in a location for each computed point in a computed set of Bezier points;

(7) comparing the quantity of said computed points in said computed set of Bezier points to one, and if said comparing shows that the quantity of said computed points is equal to one, proceeding to step (9), but if said comparing shows that the quantity of said computed points is greater than one, proceeding to step (8);

(8) designating said computed points of said computed set of Bezier points as said next points of said next set of Bezier points and repeating steps (5) through (7);

(9) drawing a point on the graphics display, said point being the "$i^{th}$" point;

(10) comparing the value of "i" to the value of "m," and if said comparing shows the value of "i" to be equal to the value of "m," the method is complete, but if said comparing shows the value of "i" to be less than the value of "m," proceeding to step (11); and (11) increasing the value of "i" by one and repeating steps (4) through (10).

* * * * *